June 9, 1925.
R. L. HOLDRIDGE
TIRE PRESSURE GAUGE HOLDER
Filed March 3, 1924
1,540,990
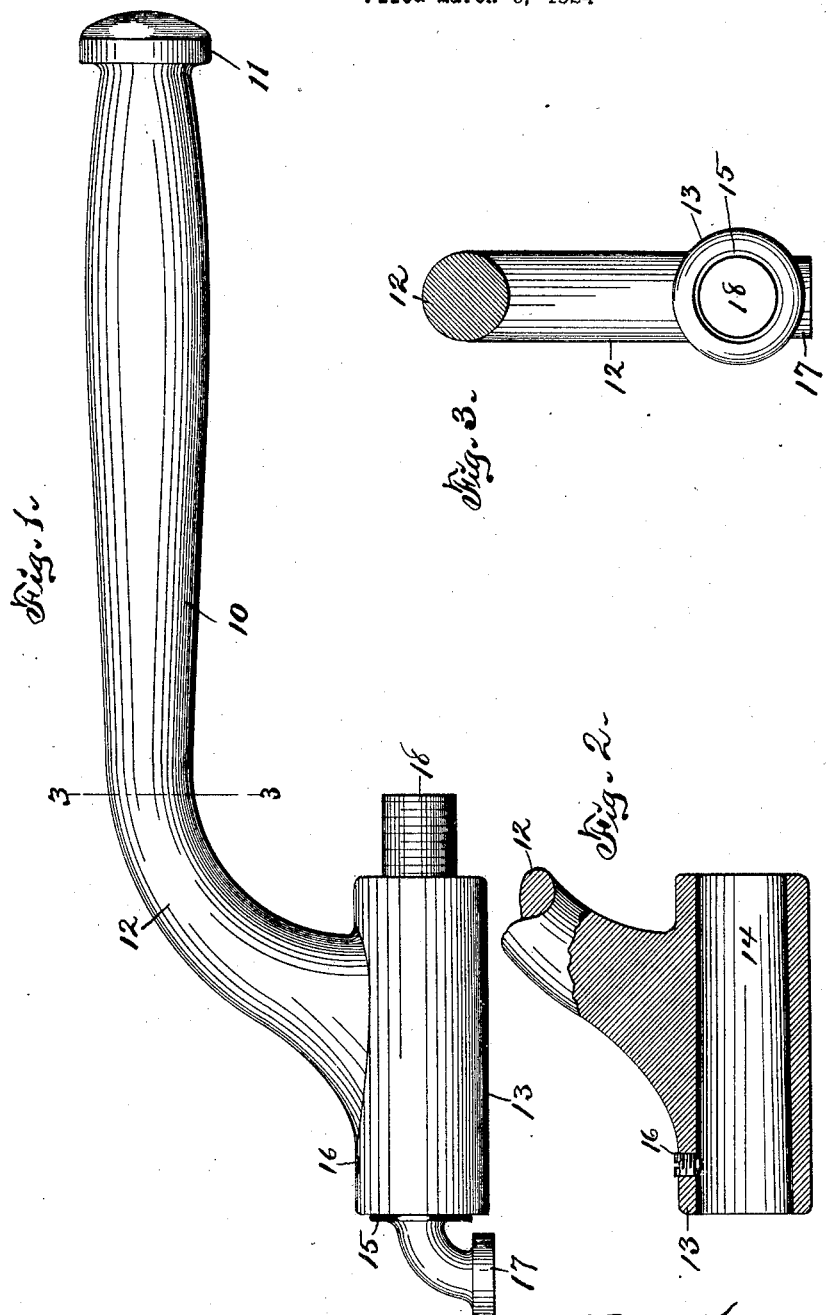

Patented June 9, 1925.

1,540,990

UNITED STATES PATENT OFFICE.

RANDALL L. HOLDRIDGE, OF DENVER, COLORADO.

TIRE-PRESSURE-GAUGE HOLDER.

Application filed March 3, 1924. Serial No. 696,703.

*To all whom it may concern:*

Be it known that I, RANDALL L. HOLDRIDGE, a citizen of the United States of America, and resident of the city and county of Denver, Colorado, have invented a new and useful Tire-Pressure-Gauge Holder, of which the following is a specification.

The object of this invention is to provide improved means for holding a tire pressure gauge.

The further object of this invention is to provide improved means for supporting and holding a tire pressure gauge for use and to minimize the loss and theft of such gauge.

A further object of this invention is to provide improved means for mounting and securing a tire pressure gauge.

A further object of this invention is to provide an improved holder for tire pressure gauge adapted for use in displaying advertising, or an advertising novelty.

My invention consists in the construction, arrangement and combination of elements hereinafter set forth, pointed out in the claim and illustrated by the accompanying drawing, in which—

Figure 1 is a side elevation of the complete device. Figure 2 is a longitudinal section of the holding head of the device, the gauge being removed. Figure 3 is a cross-section on the indicated line 3—3 of Figure 1.

In the construction of the device as shown the numeral 10 designates a handle having a boss 11 on one end and laterally curved at the opposite end forming a neck 12 having a holding head 13 on the extremity thereof. The handle, boss, neck and holding head preferably are formed in one piece of metal by molding. The handle 10 preferably is shaped for convenient hand use, being circular in cross-section, of largest diameter near its center and tapered slightly in opposite directions from its largest diameter. That portion of the neck 12 nearest the handle is of relative small diameter and the diameter of the neck enlarges slightly toward and blends into the periphery of the holding head 13. The holding head 13 is substantially cylindrical and the plane of the longitudinal center thereof when extended is substantially parallel with the plane of the longitudinal center of the handle 10. The holding head 13 is formed with a longitudinal bore 14 adapted to receive and contain a tire pressure gauge 15. The bore 14 may be slightly tapered, being of larger diameter at its outer end and the shell of the gauge 15 is pressed therein and retained by friction of the walls thereof. In addition to the frictional engagement thus provided, a set screw 16 is mounted through the wall of the holding head 13, adjacent the terminal of the neck 12 and engages the shell of the gauge 15 at its inner end. The set screw 16 is formed with a transverse slot in its outer end adapting it to be operated by a screwdriver and said outer end is substantially flush with the periphery of the head and does not project therefrom when in use. The form of gauge shown has a laterally-curved receiving end portion 17 projecting from the outer end portion of the holding head 13 adapting it for use on substantially all tire valves on all kinds of wheels; but I make no claim for this feature or any feature of construction of the gauge, as it is on the market and the well-known production of another. The graduated plunger 18, of the gauge 15, is adapted to extend, when expanded under test pressure, from the inner end of the bore 14 of the holding head 13.

When the gauge is mounted as shown, the holder provides a convenient and efficient means for carrying and retaining the gauge and for applying the same to a tire valve; and also serves to enlarge the assembly rendering it less liable to loss and theft and more visible to a prospective user.

It is contemplated to apply advertising matter, such as notice of this application or of the patent when issued by letters formed in the periphery of the holding head 13 and further advertising matter by letters formed on the periphery of the handle 10, said letters being in bas relief or alto relievio.

The diameter of the bore 14 and the length thereof may be modified to suit any selected gauge and the general dimensions of the holder may be selectively determined.

I claim as my invention—

A tire pressure gauge holder, comprising a handle, a neck laterally extending therefrom and a holding head on the outer end of the neck, said holding head being formed with a longitudinal bore substantially parallel with the handle and slightly tapered, said bore being adapted to receive and contain a gauge and open at both ends for the projection of said gauge from either end thereof.

Signed at Denver, in the county of Denver and State of Colorado, this first day of December, 1923.

RANDALL L. HOLDRIDGE.